United States Patent
Murschall et al.

(10) Patent No.: US 6,794,432 B2
(45) Date of Patent: Sep. 21, 2004

(54) TRANSPARENT, FLAME RETARDANT, THERMOFORMABLE ORIENTED FILM MADE FROM CRISTALLIZBLE THERMOPLASTICS MATERIALS, PRODUCTION METHOD AND THE UTILIZATION THEREOF

(75) Inventors: Ursula Murschall, Nierstein (DE); Ulrich Kern, Ingelheim (DE); Andreas Stopp, Ingelheim (DE); Guenther Crass, Taunusstein (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 172 days.

(21) Appl. No.: 10/181,506
(22) PCT Filed: Jan. 10, 2001
(86) PCT No.: PCT/EP01/00201

§ 371 (c)(1),
(2), (4) Date: Jul. 18, 2002

(87) PCT Pub. No.: WO01/53082

PCT Pub. Date: Jul. 26, 2001

(65) Prior Publication Data

US 2003/0032704 A1 Feb. 13, 2003

(30) Foreign Application Priority Data

Jan. 20, 2000 (DE) ......................................... 100 02 165

(51) Int. Cl.$^7$ ....................... C08K 5/5333; C08L 67/03; B32B 27/36
(52) U.S. Cl. ....................... 524/130; 428/480; 428/910; 523/351; 524/605
(58) Field of Search ................................. 524/130, 605; 523/351; 428/480, 910

(56) References Cited

U.S. PATENT DOCUMENTS 4,390,683 A    6/1983    Yatsu et al.

FOREIGN PATENT DOCUMENTS

| DE | 23 46 787 A1 | 3/1975 |
| EP | 0 306 675 A2 | 3/1989 |
| EP | 0 785 067 A1 | 7/1997 |
| GB | 2 344 596 A | 6/2000 |

*Primary Examiner*—Peter Szekely
(74) *Attorney, Agent, or Firm*—ProPat, L.L.C.

(57) ABSTRACT

The invention concerns transparent, flame-retardant, single layered or multilayered thermoformable films, containing a crystallizable thermoplastic material, preferably polyethyleneterephthalate, and at least one flame retarding agent as main components. Said films are characterized by good stretchability, thermoformability and good mechanical and optical properties, which makes them and the shaped bodies made from said films suitable for both inner and outer applications.

22 Claims, No Drawings

TRANSPARENT, FLAME RETARDANT, THERMOFORMABLE ORIENTED FILM MADE FROM CRISTALLIZBLE THERMOPLASTICS MATERIALS, PRODUCTION METHOD AND THE UTILIZATION THEREOF

The invention relates to a transparent, flame-retardant, thermoformable film made from crystallizable thermoplastics, the thickness of which is preferably in the range from 10 to 350 μm. The film comprises at least one flame retardant and has very good optical and mechanical properties, and also has good orientability and, respectively, thermoformability, and can be produced cost-effectively. The invention further relates to the use of this film and to a process for its production.

BACKGROUND OF THE INVENTION

Transparent films made from crystallizable thermoplastics with a thickness of from 10 to 350 μm are well known.

These films are not flame-retardant and not thermoformable, and therefore neither the films nor the items or moldings produced from them are suitable for applications where thermoformability and fire protection or flame retardancy are demanded.

DE-A 2346 787 describes a phospholane-modified flame-retardant polymer. As well as the polymer, the use of the polymer for producing films and fibers is claimed.

The following shortcomings are apparent when this phospholane-modified polymer is used for film production:

The polymer is very susceptible to hydrolysis and has to be very thoroughly predried. When the polymer is dried using dryers of the prior art it cakes, making production of a film impossible except under very difficult conditions.

The resultant films produced under uneconomic conditions embrittle when exposed to heat, i.e. the mechanical properties deteriorate due to embrittlement, making the film unusable. This embrittlement occurs after as little as 48 hours of exposure to heat.

It is an object of the present invention to provide a transparent, flame-retardant, thermoformable oriented film with a thickness of preferably from 10 to 350 μm which is not only cost-effective to produce and has good orientability and good mechanical and optical properties, but in particular is thermoformable and flame-retardant, and does not embrittle after exposure to heat.

Thermoformability means that the film can be thermoformed to give complex and large-surface-area moldings on commercially available thermoforming machinery without uneconomic predrying.

Flame retardancy means that in a fire protection test the transparent film fulfils the conditions of DIN 4102 Part 2 and in particular the conditions of DIN 4102 Part 1, and can be allocated to construction materials class B2 and in particular B1 for low-flammability materials.

The film is also intended to pass the UL 94 test (Vertical Burning Test for Flammability of Plastic Material), and therefore to be capable of classification to class 94 VTM-0. This means that 10 seconds after removal of the Bunsen burner the film has ceased to burn, after 30 seconds no glowing is observed, and also no dripping occurs.

Examples of the good optical properties are high light transmittance (>80%), high surface gloss (>100), low haze (<20%), and also low Yellowness Index (YI<10).

Examples of the good mechanical properties are a high modulus of elasticity ($E_{MD}$>3200 N/mm$^2$; $E_{TD}$>3500 N/mm$^2$), and also good values for tensile stress at break (in MD>100 N/mm$^2$; in TD>130 N/mm$^2$).

Good orientability includes excellent capability of the film to be oriented, without break-offs, both longitudinally and transversely during its production.

Cost-effective production includes the capability of the raw materials or the raw material components needed for producing the flame-retardant film to be dried using commercially available industrial dryers, such as vacuum dryers, fluidized-bed dryers, or fixed-bed dryers (tower dryers). It is important that the raw materials do not cake or become thermally degraded. The dryers mentioned operate at temperatures from 100 to 170° C., at which the flame-retardant polymers mentioned cake, and the dryers or extruders become blocked so that the carbonized mass has to be dug out, making film production impossible.

The vacuum dryer, which has the gentlest drying action, passes the raw material through a range of temperatures from about 30 to 130° C. in a vacuum of 50 mbar. What is known as post-drying is then required in a hopper at temperatures of from 100 to 130° C. with a residence time of from 3 to 6 hours. Even here, the flame-retardant polymers prepared according to the prior art cake to an extreme extent.

No embrittlement on exposure to heat means that after 100 hours of a heat-conditioning procedure at 100° C. in a circulating-air oven the film has not embrittled nor has disadvantageous mechanical properties.

BRIEF DESCRIPTIONS OF THE INVENTION

The object of the invention is achieved by means of a transparent oriented film with a thickness of preferably from 10 to 350 μm which comprises, as main constituent, a crystallizable thermoplastic, wherein this film comprises at least one flame retardant. This film is a mono- or biaxially oriented.

DETAILED DESCRIPTION OF THE INVENTION

The transparent film comprises, as main constituent, a crystallizable thermoplastic. According to the invention, crystallizable thermoplastics are crystallizable homopolymers, e.g. polyesters, polyolefins, or polyamides; crystallizable copolymers, e.g. polyethylene terephthalate/isophthalate, polyethylene terephthal/naphthalate; crystallizable compounded materials; crystallizable recycled material, and other types of crystallizable thermoplastics.

Preferred suitable crystallizable or semicrystalline thermoplastics are polyesters, e.g. polyethylene terephthalate, polybutylene terephthalate, polyethylene naphthalate, particular preference being given to polyethylene terephthalate (PET).

It is also possible to use mixtures of crystallizable thermoplastics. These thermoplastics preferably have crystallinities in the range from 5 to 65%.

The film of the invention may be a single-layer film or else a multilayer film. The transparent film may also have been coated with various copolyesters or adhesion promoters.

The film of the invention comprises at least one flame retardant, fed by way of what is known as masterbatch technology directly during film production, the concentration of the flame retardant being in the range from 0.5 to 30.0% by weight, preferably from 1.0 to 20.0% by weight, based on the weight of the layer of the crystallizable thermoplastic. The ratio of flame retardant to thermoplastic usually maintained during production of the masterbatch is in the range from 60:40% by weight to 10:90% by weight.

Typical flame retardants include bromine compounds, chloroparaffins, and other chlorine compounds, antimony trioxide, and aluminum trihydrates, but the halogen compounds are disadvantageous due to the halogen-containing by-products produced. Another extreme disadvantage is the low light resistance of a film provided therewith, as well as the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise the optical properties demanded are not complied with.

Since the flame retardants generally have some susceptibility to hydrolysis, it can be advisable to add a hydrolysis stabilizer.

The hydrolysis stabilizers used are generally phenolic stabilizers, alkali metal/alkaline earth metal stearates, and/or alkali metal/alkaline earth metal carbonates, in amounts of from 0.01 to 1.0% by weight. The amount used of phenolic stabilizers is preferably from 0.05 to 0.6% by weight, in particular from 0.15 to 0.3% by weight, and their molar mass is preferably above 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

In one preferred embodiment, the transparent, flame-retardant film of the invention comprises, as main constituent, a crystallizable polyethylene terephthalate, and, as flame retardant, from 1 to 20% by weight of an organophosphorus compound soluble in the polyethylene terephthalate, and from 0.1 to 1.0% by weight of a hydrolysis stabilizer. Dimethyl methylphosphonate is preferred as flame retardant.

This information relating to flame retardant and hydrolysis stabilizer is also applicable to other thermoplastics to be used according to the invention.

It is important for the invention that the crystallizable thermoplastic has a diethylene glycol content (DEG content) of $\geq 1.0\%$ by weight, preferably $\geq 1.2\%$ by weight, in particular $\geq 1.3\%$ by weight, and/or a polyethylene glycol content (PEG content) of $\geq 1.0\%$ by weight, preferably $\geq 1.2\%$ by weight, in particular $\geq 1.3\%$ by weight, and/or an isophthalic acid (IPA) of from 3 to 10% by weight.

It was more than surprising that by virtue of a diethylene glycol content and/or polyethylene glycol content and/or IPA content which is higher than that of standard thermoplastics the films can be thermoformed on commercially available thermoforming systems and give excellent reproduction of detail.

The surface gloss of the films of the invention, measured to DIN 67530 (measurement angle 20°) is greater than 100, preferably greater than 120, and the light transmittance L, measured to ASTM D 1003, is more than 80%, preferably more than 84%, and the haze of the film, measured to ASTM D 1003, is less than 20%, preferably less than 15%, which is surprisingly good for the flame retardancy achieved.

The standard viscosity SV (DCA) of the polyethylene terephthalate, measured in dichloroacetic acid to DIN 53728, is preferably from 600 to 1000, with preference from 700 to 900. The crystallite melting point measured by DSC with a heating rate of 10° C./min is preferably in the range from 220 to 280° C.

It is surprising here that a higher diethylene glycol content and/or polyethylene glycol content than in standard polyester gives oriented PET films thermoforming capability.

The thermoforming process generally encompasses the steps of predrying, heating, molding, cooling, demolding, and heat-conditioning. Surprisingly, during the thermoforming process it was found that the films of the invention can be thermoformed without prior predrying. This advantage over thermoformable polycarbonate films or thermoformable polymethacrylate films, both of which, depending on thickness, require predrying times of from 10 to 15 hours at temperatures of from 100 to 120° C., drastically reduces the costs of the forming process.

The film of the invention, preferably a PET film, which comprises at least one flame retardant, may be either a single-layer film or else a multilayer film.

In the multilayer embodiment, the film is composed of at least one core layer and of at least one outer layer, particular preference being given to a three-layer A-B-A or A-B-C structure. The thicknesses of the outer layers are preferably from 0.5 to 2 µm.

For this embodiment it is important that the polyethylene terephthalate of the core layer and the polyethylene terephthalate of the outer layer(s) adjacent to the core layer have similar standard viscosity and similar DEG content and/or PEG content.

In one particular embodiment, the outer layers may also be composed of a polyethylene naphthalate homopolymer, or of polyethylene theraphthalate-polyethylene naphthalate copolymers, or a compounded material.

In this embodiment, the thermoplastics of the outer layers likewise have standard viscosities similar to those of the polyethylene therephthalate of the core layer.

In the multilayer embodiment, the flame retardant is preferably present in the outer layer(s). However, if required, flame retardant may also have been provided in the core layer.

Unlike in the single-layer embodiment, the concentration of the flame retardant here is based on the weight of the thermoplastic in the modified layer. The concentration ranges are identical with those in the base layer.

Very surprisingly, fire protection tests to DIN 4102, and the UL test, have shown that in order to achieve improved flame retardancy in a three-layer film it is fully sufficient for the outer layers of thickness from 0.5 to 2 µm to have been provided with flame retardant. If required, and if fire protection requirements are stringent, it is also possible for the core layer to have been provided with flame retardant, i.e. to comprise what is known as a base level of modification.

The result is that the flame-retardant, thermoformable multilayer films produced using known coextrusion technology are of greater economic interest than monofilms provided with high concentrations throughout, since markedly less flame retardant is needed.

At least one side of the film may also have been provided with a scratch-resistant coating, with a polyester, or with an adhesion promoter.

During production of the film of the invention, it was moreover found that the use of masterbatch technology, and of appropriate predrying or precrystallization of the masterbatch, and, where appropriate, the use of small concentrations of hydrolysis stabilizer, permit the production of the flame-retardant thermoformable film without any caking in the dryer. In addition, neither any evolution of gases nor any formation of deposits was found in the production process.

Measurements also showed that the film of the invention does not embrittle over a prolonged period of exposure to heat at 100° C. This result is attributed to the synergistic action of appropriate precrystallization, predrying, masterbatch technology, and hydrolysis stabilizer.

The film of the invention and, respectively, the molding can therefore be recycled without difficulty, and without pollution of the environment, and without any loss of mechanical properties, and the film is therefore suitable, for example, for use as short-lived advertising placards, in the construction of exhibition stands, and for other promotional items, where fire protection and thermoformability is desired.

The film can moreover be thermoformed without predrying, and therefore can be used to produce complex moldings.

Examples of process parameters found for the thermoforming process are the following:

| Step of process | Film of invention |
|---|---|
| Predrying | Not required |
| Mold temperature ° C. | 100–160 |
| Heating time | <5 sec per 10 μm of thickness |
| Film temperature during shaping ° C. | 160–200 |
| Possible orientation factor | 1.5–2.0 |
| Reproduction of detail | good |
| Shrinkage % | <1.5 |

Surprisingly, even in the range of thickness from 10 to 350 μm the films of the invention comply with the requirements of construction materials classes B2 and B1 to DIN 4102 and with those of the UL 94 test.

A film of the invention may be produced by the extrusion process, for example, on an extrusion line.

According to the invention, the flame retardant is added by means of masterbatch technology. The flame retardant is dispersed in a carrier material.

Carrier materials which may be used are the thermoplastic itself, e.g. the polyethylene terephthalate, or else other polymers compatible with the thermoplastic.

The DEG content and/or PEG content of the polyethylene terephthalate are advantageously set during the polymerization process at the premises of the polymer producer.

In masterbatch technology it is important that the grain size and the bulk density of the masterbatch are similar to the grain size and the bulk density of the thermoplastic, permitting uniform distribution and therefore uniform flame retardancy.

The films of the invention may be produced by known processes, e.g. from a polyester with, where appropriate, other polymers, and the flame retardant, and/or other conventional additives (e.g. antiblocking agents, lubricants, etc.) in a usual amount of from 0.1 to not more than 30% by weight, either in the form of a monofilm or else in the form of multilayer, where appropriate coextruded, films with surfaces of identical or different types, for example one surface having pigmentation while no pigment is present in the other surface. One or both surfaces of the film may also be provided with a conventional functional coating by known processes.

It was therefore more than surprising that use of masterbatch technology, of appropriate predrying and/or precrystallization, and, where appropriate, use of small amounts of a hydrolysis stabilizer, permit the cost-effective production of a flame-retardant and thermoformable film with the property profile demanded without caking in the dryer; and that the film does not embrittle on exposure to heat and does not fracture when creased.

It was also surprising that
within the bounds of accuracy of measurement, there is no adverse effect on the Yellowness Index of the film in comparison with an unmodified film;
during production of the film there is no evolution of gases, nor any formation of die deposits, nor any condensation onto frames, the result being that the film has excellent optical properties and exceptional profile, and outstanding layflat;
the flame-retardant film has excellent stretchability and can therefore be produced safely and stably in a reliable process on high-speed film lines at speeds of up to 420 m/min.

With this, a film of this type is also cost-effective.

It is moreover very surprising that the recycled material generated from the films or from the moldings can be reused without any adverse effect on the Yellowness Index of the film.

The surprising combination of exceptional properties gives the film of the invention, and moldings produced therefrom, outstanding suitability for a wide variety of applications, for example interior decoration, for the construction of exhibition stands, for exhibition requisites, as displays, for signs, for the protective glazing of machinery or of vehicles, in the lighting sector, in the fitting out of shops or of stores, as a promotional item or laminating medium, or for greenhouses, roofing systems, external cladding, protective coverings, applications in the construction sector, or illuminated advertising profiles, blinds, or electrical applications.

Due to its thermoformability, the film of the invention is suitable for the thermoforming of any desired moldings for indoor or outdoor applications.

The invention is described in more detail below, using examples.

The following standards or methods are used here for the testing of individual properties.

Test Methods
DIN=Deutsches Institut für Normung [German Institute for Standardization]
ISO=International Organization for Standardization
DEG Content/PEG Content IPA Content
  DEG/PEG/IPA content is determined by gas chromatography after saponification in methanolic KOH and neutralization with aqueous HCl.
Surface Gloss
  Surface gloss is measured with a measurement angle of 20° to DIN 67530.
Light Transmittance
  For the purposes of the present invention, light transmittance is the ratio of total light transmitted to the amount of incident light.
  Light transmittance is measured using "®HAZEGARD plus" test equipment to ASTM D 1003.
Haze
  Haze is that percentage proportion of transmitted light which deviates by more than 2.5° from the average direction of the incident light beam. Clarity is determined at an angle of less than 2.5°.
  Haze is measured using "HAZEGARD plus" apparatus to ASTM D 1003.

Surface Defects

Surface defects are determined visually.

Mechanical Properties

Modulus of elasticity and tensile stress at break are measured longitudinally and transversely to ISO 527-1-2.

SV (DCA) and IV (DCA)

Standard viscosity SV (DCA) is measured in dichloroacetic acid by a method based on DIN 53726.

Intrinsic viscosity (IV) is calculated as follows from standard viscosity (SV)

$$IV(DCA)=6.67 \cdot 10^{-4} SV(DCA)+0.118$$

Fire Performance

Fire performance is determined to DIN 4102 Part 2, construction materials class B2, and to DIN 4102 Part 1, construction materials class B1, and also by the UL 94 test.

EXAMPLES

Example 1

A transparent film of 50 μm thickness is produced, comprising polyethylene terephthalate as principal constituent, 0.2% by weight of SYLOBLOC® synthetic amorohous silica as antiblocking agent, 0.2% by weight of hydrolysis stabilizer, and 4% by weight of flame retardant.

To obtain homogeneous distribution, the SYLOBLOC® synthetic amorphous silica, which is insoluble in the PET, is incorporated into the polyethylene terephthalate at the premises of the polymer producer.

The polyethylene terephthalate from which the transparent film is produced has a standard viscosity SV (DCA) of 810, corresponding to an intrinsic viscosity IV (DCA) of 0.658 dl/g, and has a DEG content of 1.6% by weight and a PEG content of 1.7% by weight.

The hydrolysis stabilizer and the flame retardant are fed in the form of a masterbatch. The masterbatch is composed of 20% by weight of flame retardant, 1% by weight of hydrolysis stabilizer, and 79% by weight of polyethylene terephthalate.

The hydrolysis stabilizer is pentaerythrityl tetrakis 3-(3, 5-di-tert-butyl-4-hydroxy-phenyl) propoionate.

The flame retardant is the organophosphorus compound dimethyl methylphosphonate, ®Amgard P1045 from Albright & Wilson, dissolved in the PET.

The masterbatch has a bulk density of 750 kg/m² and a softening point of 69° C.

50% by weight of the polyethylene terephthalate, 30% by weight of recycled polyethylene terephthalate material, and 20% by weight of the masterbatch are charged at room temperature from separate feed vessels into a vacuum dryer which from the juncture of charging to the end of the residence time passes through a temperature profile of from 25 to 130° C. During the residence time of about 4 hours, the mixture of raw materials is stirred at 61 rpm.

The precrystallized or predried raw material mixture is post-dried in the downstream hopper, likewise in vacuo, for 4 hours at 140° C. The 50 μm monofilm is then produced by the extrusion process described.

The transparent PET film produced has the following property profile:

| | | |
|---|---|---|
| Thickness | | 50 μm |
| Surface gloss, | Side 1 | 155 |
| (Measurement angle 20°) | Side 2 | 152 |
| Light transmittance | | 91% |
| Haze | | 4.0% |
| Surface defects per m² | | none |
| Longitudinal modulus of elasticity | | 3600 N/mm² |
| Transverse modulus of elasticity | | 4700 N/mm² |
| Longitudinal tensile stress at break | | 110 N/mm² |
| Transverse tensile stress at break | | 180 N/mm² |
| Yellowness Index (YI) | | 3.1 |

There is no change to the mechanical properties after 200 hours of heat-conditioning at 100° C. in a circulating-air drying cabinet. The film exhibits no embrittlement phenomena of any kind.

The film complies with the requirements for contruction materials classes B2 and B1 to DIN 4102 Part 2/Part 1. The film passes the UL 94 test.

Example 2

Coextrusion technology is used to produced a multilayer PET film of thickness 17 μm, with layer sequence A-B-A, B being the core layer and A being the outer layers. The thickness of the core layer is 15 μm and that of each of the outer layers which cover the core layer is 1 μm.

The polyethylene terephthalate used for the core layer B is identical with that of Example 1, but does not comprise any Sylobloc®. The core layer comprises 0.2% by weight of hydrolysis stabilizer and 5% by weight of flame retardant. The hydrolysis stabilizer and the flame retardant are fed in the form of a masterbatch, as in Example 1. The masterbatch is composed of 25% by weight of flame retardant, 1% by weight of hydrolysis stabilizer, and 74% by weight of polyethylene terephthalate. The hydrolysis stabilizer and the flame retardant are identical with those of Example 1.

The polyethylene terephthalate of the outer layer A is identical with polyethylene terephthalate of Example 1, i.e. the outer layer polymer has been provided with 0.3% by weight of Sylobloc®. The outer layers do not comprise any hydrolysis stablizer, nor any flame retardant.

For the core layer, 50% by weight of polyethylene terephthalate, 30% by weight of recycled polyethylene terephthalate material, and 20% by weight of the masterbatch described are precrystallized, predried, and post-dried, as in Example 1.

The outer layer polymer does not undergo any specific drying. Coextrusion technology is used to produce a film of 17 μm thickness with the layer sequence A-B-A, which exhibits the following properties:

| | | |
|---|---|---|
| Layer structure | | A-B-A |
| Total thickness | | 17 μm |
| Surface gloss, | Side 1 | 174 |
| (Measurement angle 20°) | Side 2 | 169 |
| Light transmittance | | 94.2% |
| Haze | | 2.1% |
| Surface defects per m² | | none |
| Longitudinal modulus of elasticity | | 3400 N/mm² |
| Transverse modulus of elasticity | | 4150 N/mm² |
| Longitudinal tensile stress at break | | 125 N/mm² |
| Transverse tensile stress at break | | 160 N/mm² |
| Yellowness Index (YI) | | 2.9 |

There is no change to the mechanical properties after 200 hours of heat-conditioning at 100° C. in a circulating-air drying cabinet. The film exhibits no embrittlement phenomena of any kind.

The film complies with the requirements for contruction materials classes B2 and B1 to DIN 4102 Part 2/Part 1. The film passes the UL 94 test.

Example 3

A 20 μm A-B-A film is produced as in Example 2, the thickness of the core layer B being 16 μm and that of each of the outer layers A being 2 μm.

The core layer B comprises only 5% by weight of the masterbatch of Example 2.

The outer layers are identical with those of Example 2 except that they comprise 20% by weight of the masterbatch which in Example 2 was used only for the core layer.

The raw materials and the masterbatch for the core layer and outer layers are crystallized, predried, and post-dried as in Example 1.

The multilayer 20 μm film produced by means of coextrusion technology has the following property profile:

| Layer structure | | A-B-A |
|---|---|---|
| Total thickness | | 20 μm |
| Surface gloss, | Side 1 | 170 |
| (Measurement angle 20°) | Side 2 | 166 |
| Light transmittance | | 92.0% |
| Haze | | 2.7% |
| Surface defects per m$^2$ | | none |
| Longitudinal modulus of elasticity | | 3500 N/mm$^2$ |
| Transverse modulus of elasticity | | 4100 N/mm$^2$ |
| Longitudinal tensile stress at break | | 120 N/mm$^2$ |
| Transverse tensile stress at break | | 155 N/mm$^2$ |
| Yellowness Index (YI) | | 2.9 |

There is no change to the mechanical properties after 200 hours of heat-conditioning at 100° C. in a circulating-air drying cabinet. The film exhibits no embrittlement phenomena of any kind.

The film complies with the requirements for contruction materials classes B2 and B1 to DIN 4102 Part 2/Part 1. The film passes the UL 94 test.

Thermoformability

The films from Examples 1 to 3 can be thermoformed to give moldings on commercially available thermoforming machinery, e.g. from the company Illig, without predrying. The reproduction of detail in the moldings is outstanding, and the surface is uniform.

Comparative Example 1

Example 1 is repeated. However, the film is not provided with masterbatch, i.e. the film comprises no hydrolysis stabilizer and no flame retardant. The PET used has a conventional DEG content of 0.6% by weight and comprises no PEG.

The transparent PET film produced has the following property profile:

| Thickness | | 50 μm |
|---|---|---|
| Surface gloss, | Side 1 | 160 |
| (Measurement angle 20°) | Side 2 | 155 |
| Light transmittance | | 92% |
| Haze | | 3.9% |

-continued

| Surface defects per m$^2$ | none |
|---|---|
| Longitudinal modulus of elasticity | 4300 N/mm$^2$ |
| Transverse modulus of elasticity | 5800 N/mm$^2$ |
| Longitudinal tensile stress at break | 180 N/mm$^2$ |
| Transverse tensile stress at break | 240 N/mm$^2$ |
| Yellowness Index (YI) | 3.0 |

The unmodified film does not pass the tests to DIN 4102 Part 1 or Part 2, or the UL 94 test.

The film has insufficient thermoformability.

What is claimed is:

1. A transparent, thermoformable, oriented film comprising a crystallizable polyester or a mixture of various crystallizable polyesters having
   a diethylene glycol content or a polyethylene glycol content or
   a diethylene glycol content and a polyethylene glycol content of ≧1% by weight or
   an isophthalic acid content of from about 3 to about 10% by weight or
   a diethylene glycol content or a polyethylene glycol content or
   a diethylene glycol content and a polyethylene glycol content of ≧1% by weight and
   an isophthalic acid content of from about 3 to about 10% by weight, and comprising at least one flame retardant which comprises an organophosphorus compound soluble in the crystallizable polyester.

2. The film as claimed in claim 1, wherein the thermoplastic polyester has a crystallinity in the range from about 5 to about 65%.

3. The film as claimed in claim 1, wherein the polyester comprises polyethylene terephthalate, polybutylene terephthalate or polyethylene naphithalate.

4. The film as claimed in claim 3, wherein the polyester comprises polyethylene terephthalate.

5. The film as claimed in claim 4, wherein the polyethylene terephthalate has a diethylene glycol content or a polyethylene glycol cantent or a diethylene glycol content and a polyethylene glycol content of more than 1.3% by weight.

6. The film as claimed in claim 4, wherein the polyethylene terephtbalate hss a diethylene glycol content or a polyethylene glycol content or a diethylene glycol content and a polyethylene glycol content of from about 1.6 to about 5% by weight.

7. The film as claimed in claim 4, wherein the polyethylene terephthalate has a standard viscosity SV (DCA) of from about 600 to about 1000.

8. The film as claimed in claim 1, wherein the flame retardant or the flame retardants comprise organophosphorus compounds or mixtures of organophosphorus compounds.

9. The film as claimed in claim 8, wherein the organophosphorus compound or the organophosphorus compounds is or are soluble in the thermoplastic or thermoplastics.

10. The film as claimed in claim 8, wherein the flame retardant comprises dimethyl methylphosphonate.

11. The film as claimed in claim 1, wherein the concentration of the flame retardant or flame retardants is from about 0.5 to about 30% by weight, based on the weight of the layer of the crystallizable thermoplastic or thermoplastics.

12. The film as claimed in claim 11, wherein the concentration of the flame retardant or flame retardants is from about 1 about 20% by weight, based on the weight of the layer of the crystallizable thermoplastic or thermoplastics.

13. The film as claimed in claim 1, wherein the film comprises from about 0.1 to about 1% by weight of a hydrolysis stabilizer, based on the weight of the layer of the crystallizable thermoplastic or thermoplastics.

14. The film as claimed in claim 13, wherein the hydrolysis stabilizer comprises pentaerythrityl tetrakis-3-(3,5-di-tert-butyl-4-hydroxyphenyl)propionate or 1,3,5-trimethyl-2,4,6-tris(3,5-di-tert-butyl4-hydroxybenzyl)benzene.

15. The film as claimed in claim 1, wherein the film has two or more layers.

16. The film as claimed in claim 15, wherein the flame retardant is present in the outer layer or outer layers.

17. The film as claimed in claim 1, wherein the film has a thickness of from about 1 to about 350 µm.

18. The film as claimed in claim 1, wherein the film is been biaxially oriented.

19. A process for producing a film as claimed in claim 1, comprising the steps of melting, extruding, orienting and setting a crystallizable polyester or a mixture made from crystallizable polyesters in an extruder, together with at least one flame retardant.

20. The process as claimed in claim 18, wherein the flame retardant is added by means of masterbatch technology.

21. A method of making a molding comprising transforming a film according to claim 1 into a molding.

22. A molding manufactured by the method of claim 21.

* * * * *